(12) United States Patent
Dieleman

(10) Patent No.: US 10,498,183 B2
(45) Date of Patent: Dec. 3, 2019

(54) FLEXIBLE WINDING FOR AN ELECTRIC MOTOR AND METHOD OF PRODUCING

(75) Inventor: Krijn Dieleman, Dordrecht (NL)

(73) Assignee: Allied Motion Technologies Inc., Englewood, CO (US)

(*) Notice: Subject to any disclaimer, the term of this patent is extended or adjusted under 35 U.S.C. 154(b) by 0 days.

(21) Appl. No.: 13/444,666

(22) Filed: Apr. 11, 2012

(65) Prior Publication Data

US 2013/0009511 A1  Jan. 10, 2013

Related U.S. Application Data

(60) Provisional application No. 61/474,141, filed on Apr. 11, 2011.

(51) Int. Cl.
*H02K 3/26* (2006.01)
*H02K 15/04* (2006.01)

(52) U.S. Cl.
CPC .......... *H02K 3/26* (2013.01); *Y10T 29/49009* (2015.01)

(58) Field of Classification Search
CPC .. H02K 3/28; H02K 3/12; H02K 3/18; H02K 3/26; Y10T 29/49009
USPC .............................................. 310/208; 29/596
See application file for complete search history.

(56) References Cited

U.S. PATENT DOCUMENTS

| 3,084,420 A | 4/1963 | Burr et al. |
| 3,587,019 A | 6/1971 | Bull et al. |
| 3,609,431 A | 9/1971 | Lifschitz |
| 3,702,450 A | 11/1972 | Avery et al. |
| 3,736,543 A | 5/1973 | Lademann et al. |
| 3,805,104 A | 4/1974 | Margrain et al. |
| 3,816,907 A | 6/1974 | Small |
| 3,944,857 A | 3/1976 | Faulhaber |
| 4,271,370 A * | 6/1981 | DiMeo .................. H02K 13/08 310/207 |
| 4,340,833 A | 7/1982 | Sudo et al. |
| 4,639,708 A | 1/1987 | Weatherly |
| 4,645,961 A | 2/1987 | Malsky |
| 4,843,269 A * | 6/1989 | Shramo .................. H02K 21/14 310/104 |
| 5,225,770 A * | 7/1993 | Montagu ...................... 324/146 |
| 5,240,003 A | 8/1993 | Lancee et al. |
| 5,424,632 A * | 6/1995 | Montagu ...................... 324/146 |
| 5,493,157 A | 2/1996 | Nakamura |
| 5,822,652 A | 10/1998 | Elhatem et al. |
| 5,994,703 A | 11/1999 | Arai |

(Continued)

FOREIGN PATENT DOCUMENTS

| GB | 2336934 A | 11/1999 |
| JP | S55127852 | 10/1980 |

(Continued)

OTHER PUBLICATIONS

Translation of foreign document JP 06253481 A (Year: 1994).*

(Continued)

*Primary Examiner* — Alex W Mok
(74) *Attorney, Agent, or Firm* — Hodgson Russ LLP

(57) ABSTRACT

A flexible winding, for a brushless, rotating motor, comprising a flexible substrate. A first winding circuit is disposed on a first side of the substrate. The flexible substrate is rolled into a substantially cylindrical shape such that the first winding circuit forms a winding suitable for an electric machine, such as a rotary motor.

13 Claims, 4 Drawing Sheets

(56) References Cited

U.S. PATENT DOCUMENTS

| | | | |
|---|---|---|---|
| 6,111,329 A | 8/2000 | Graham et al. | |
| 6,144,281 A * | 11/2000 | Lorris | H01F 5/003 |
| | | | 310/208 |
| 6,275,319 B1 * | 8/2001 | Gadhok | 359/198.1 |
| 6,307,292 B1 * | 10/2001 | Brown | 310/90 |
| 6,344,704 B1 | 2/2002 | Hansen | |
| 6,483,219 B2 * | 11/2002 | Nikolic | H02K 31/00 |
| | | | 310/178 |
| 6,568,065 B2 * | 5/2003 | Graham | H02K 3/26 |
| | | | 29/254 |
| 6,861,773 B2 | 3/2005 | Iwase et al. | |
| 6,982,504 B2 | 1/2006 | Brown | |
| 7,612,479 B2 * | 11/2009 | Doi et al. | 310/156.38 |
| 7,786,450 B2 | 8/2010 | Zach et al. | |
| 2004/0201302 A1 * | 10/2004 | Tanaka | H02K 3/28 |
| | | | 310/179 |
| 2005/0285470 A1 * | 12/2005 | Itoh | H02K 3/26 |
| | | | 310/208 |
| 2006/0248707 A1 * | 11/2006 | Tanaka | H02K 3/28 |
| | | | 29/597 |
| 2009/0072651 A1 | 3/2009 | Yan et al. | |
| 2009/0295168 A1 * | 12/2009 | Meinke | H02K 3/28 |
| | | | 290/55 |
| 2010/0007230 A1 | 1/2010 | Suzuki | |
| 2010/0253167 A1 * | 10/2010 | Charnley | H02K 1/2786 |
| | | | 310/83 |

FOREIGN PATENT DOCUMENTS

| | | |
|---|---|---|
| JP | 59-092761 A | 5/1984 |
| JP | H213249 | 1/1990 |
| JP | 05-064404 A | 3/1993 |
| JP | 06-105493 A | 4/1994 |
| JP | 06-141500 A | 5/1994 |
| JP | 06-253481 A | 9/1994 |
| JP | 2002027720 | 1/2002 |
| KR | 20-1999-0040336 U | 11/1999 |

OTHER PUBLICATIONS

Bräuer, P., et al., Screen Printed Windings for Small-Power Electrical Machines, Teh 8th France-Japan and 6th Europe-Asia Congress on Mechatronics, Nov. 22-24, 2010, Yokohama, Japan, pp. 278-283.

Low, T.S., et al., Design aspects and performance of a slotless PM motor for hard disk drives, Industry Applications Conference, Oct. 8-12, 1995, Thirtieth IAS Annual Meeting, IAS '95, Conference Record of the 1995 IEEE, vol. 1, pp. 664-671.

* cited by examiner

FLEXIBLE WINDING FOR AN ELECTRIC MOTOR AND METHOD OF PRODUCING

CROSS-REFERENCE TO RELATED APPLICATIONS

This application claims priority to U.S. Provisional Application No. 61/474,141, filed on Apr. 11, 2011, the disclosure of which is incorporated herein by reference.

FIELD OF THE INVENTION

The invention relates to the field of electric machines, and more particularly to windings for use in electric machines.

BRIEF SUMMARY OF THE INVENTION

A device according to an embodiment of the present invention may be embodied as a slotless, brushless motor, having a permanent magnet rotor magnetic field, and an electromagnetic stator magnetic field wherein the stator field is produced by a 3-phase air gap winding with a stator back-iron structure. The winding is laid-out on a flat flexible printed circuit, which is rolled up into a cylinder so that the phases are separated by 120 degrees. Because the windings of the 3-phases are not all placed radially in an equivalent magnetic field, in order to produce a consistent torque across the 3-phases, the number of turns in the coils of each phase may be different. In an exemplary embodiment, two circuits are used to increase the number of turns within the winding, with copper coils on either side of the flex (2-layer flex). Thus, there are 4 copper coil structures per phase.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
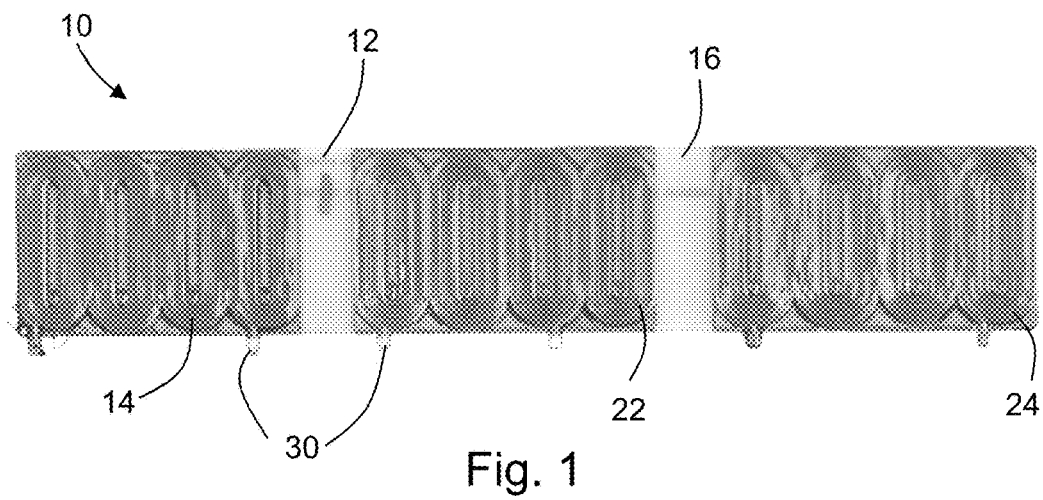
FIG. 1 shows a flexible winding according to an embodiment of the present invention shown before forming into a cylindrical shape.
Figure 3:
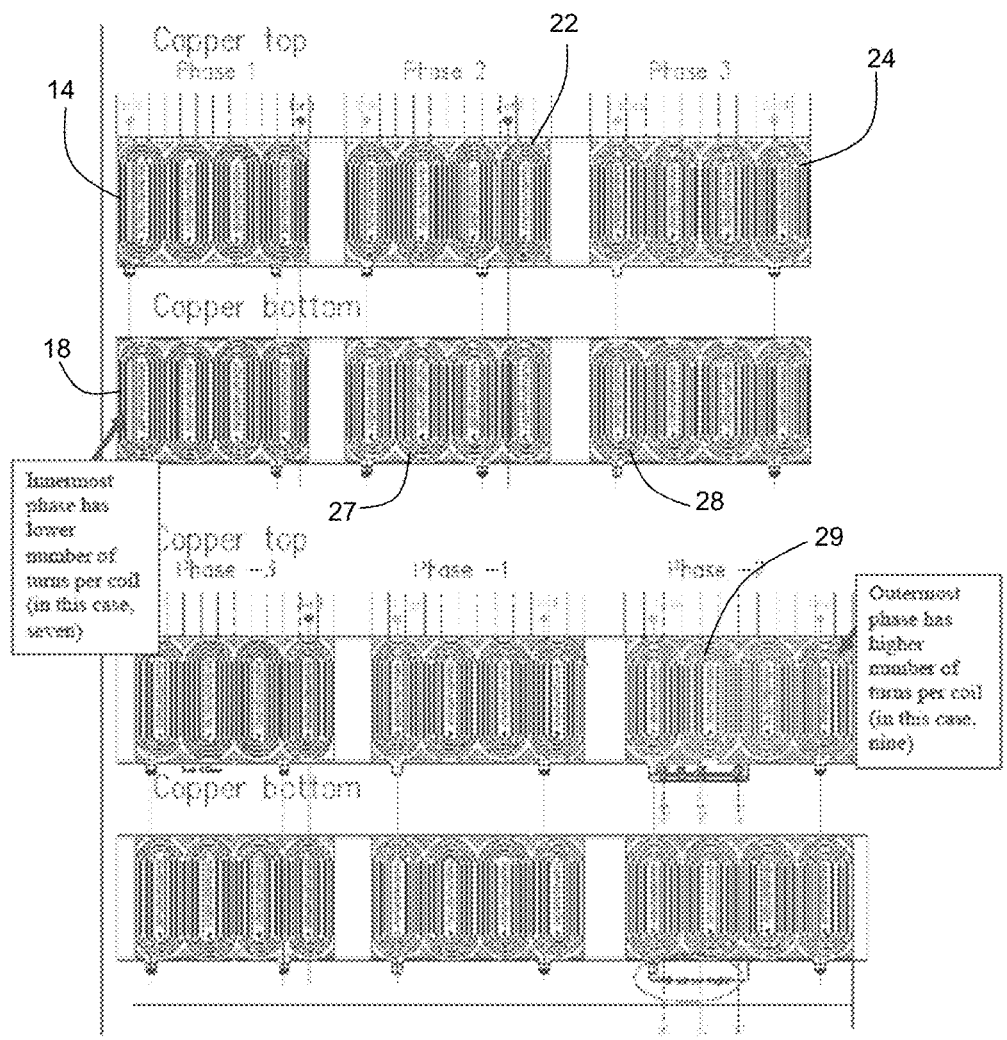
FIG. 3 shows circuit diagrams of an exemplary three-phase, two-layer flexible winding according to an embodiment of the present invention.

The present invention may be embodied as a flexible winding 10 for a brushless, rotating motor (see, e.g., FIG. 1). The flexible winding 10 comprises a flexible substrate 12. The flexible substrate 12 may be, for example without limitation, polyimide. A first winding circuit 14 is disposed on a first side 16 of the substrate 12. The first winding circuit 14 may be configured as a rounded rectangular spiral (see, e.g., FIG. 3), a rectangular spiral having chamfered corners, or any other shape selected to accomplish the winding function of an electric machine. A second-side winding circuit 18 (see, e.g., FIG. 3) may be disposed on a second side 20 of the substrate 12. The second-side winding circuit 18 may be configured to electrically cooperate with the first winding circuit 14 to enhance the winding function. The first winding circuit 14 and the second-side winding circuit 18 may be in electrical communication by way of a conductor (not shown) which may be disposed in a via of the flexible substrate 12.

Figure 2:
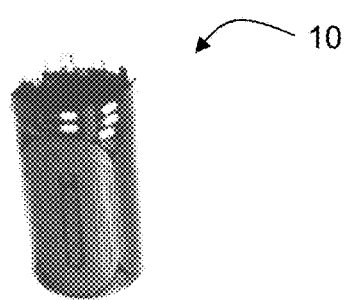
FIG. 2 shows the flexible winding of FIG. 1 rolled into a substantially cylindrical shape.

The flexible substrate 12 is rolled into a cylinder shape (see, e.g., FIG. 2) such that the first winding circuit 14 forms a winding suitable for an electric machine, for example without limitation, a rotary motor.

The flexible winding 10 may include a second winding circuit 22 on the first side 16 of the flexible substrate 12. The first winding circuit 14 and the second winding circuit 22 may be configured such that when the flexible winding 10 is formed into a cylinder shape, the winding circuits align. In another embodiment, the first winding circuit 14 and the second winding circuit 22 are configured so that when the flexible winding 10 is formed into a cylinder shape of a pre-determined diameter (or circumference or otherwise), the winding circuits are offset such that the circuits are out-of-phase.

The flexible winding 10 may include a third winding circuit 24 on the first side 16 of the flexible substrate 12. The first winding circuit 14, the second winding circuit 22, and the third winding circuit 24 may be configured such that when the flexible winding 10 is formed into a cylinder shape, the winding circuits align. In another embodiment, the first winding circuit 14, the second winding circuit 22, and the third winding circuit 24 are configured so that when the flexible winding 10 is formed into a cylinder shape, the winding circuits are offset such that the circuits are out-of-phase. In an exemplary embodiment, depicted in FIG. 3, the winding circuits are configured such that each of the first, second, and third winding circuits 14, 22, 24 are offset by 120° when the flexible substrate 12 is rolled into a cylinder shape of a predetermined diameter (circumference, etc.) Such an embodiment forms a 3-phase winding suitable for use as a stator of a rotary electric motor.

In embodiments of the flexible winding where a rolled, cylindrical flexible winding has multiple layers (the substrate is rolled into a spiral shape with multiple layers), each layer is at a different radial position—the effective radius of each layer is different. It may be desirable that each winding circuit is configured to compensate for this difference in position such that the torque caused by (energy produced by) each winding is substantially the same. In the exemplary embodiment depicted in FIG. 3, the spiral coils of each winding have turns that vary from seven turns 27, to eight turns 28, to nine turns 29. In this way, the torque is substantially consistent across the three phases. Other combinations of turns in each layer may be used, and the number of turns in each layer need not be different (some layers may be configured the same, while others are configured differently). The number of turns in each coil of a winding circuit may be the same as or different from the other coils of the same winding circuit.

The winding circuits 14, 22, 24 may have at least one tab 30 by which the winding circuits 14, 22, 24 may be accessed and electrically connected to other circuits.

The flexible winding 10 may further comprise an insulating layer to prevent the conductive layer from contacting another conductive object.

Figure 4:
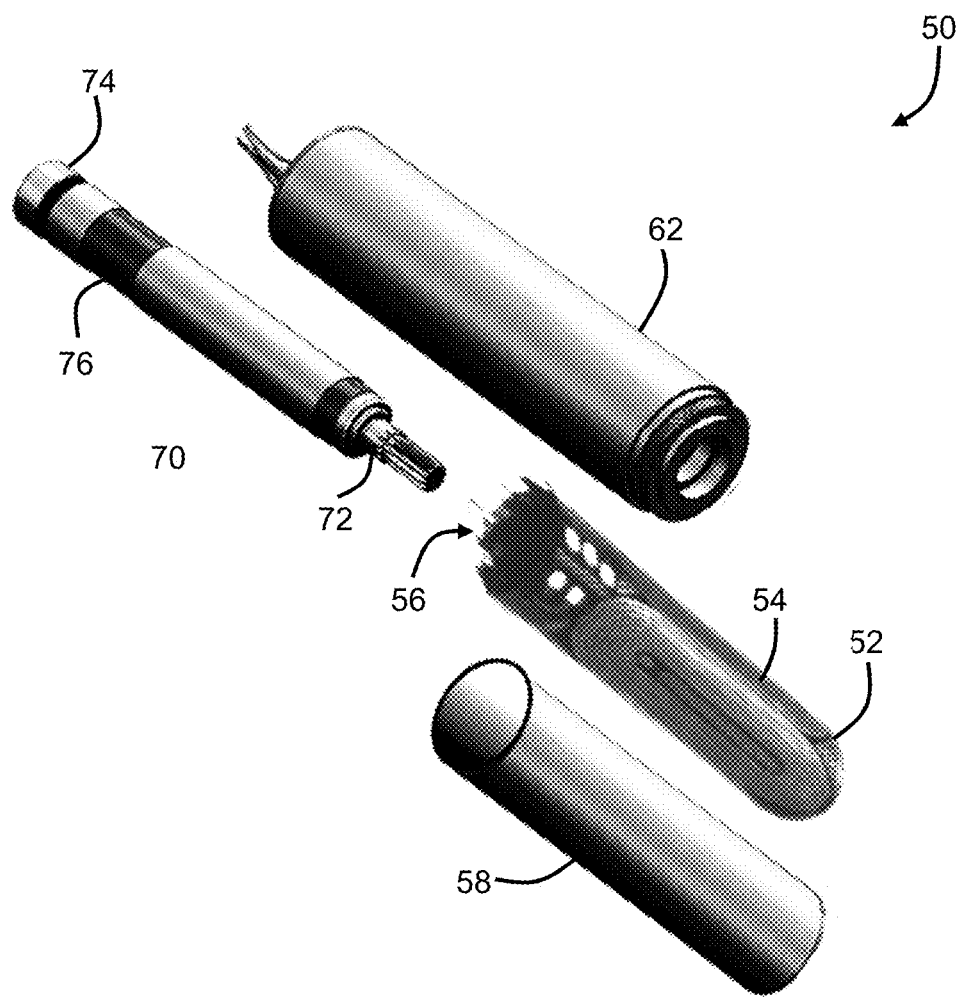
FIG. 4 is an exploded view of an electric machine according to an embodiment of the present invention.
Figure 5:
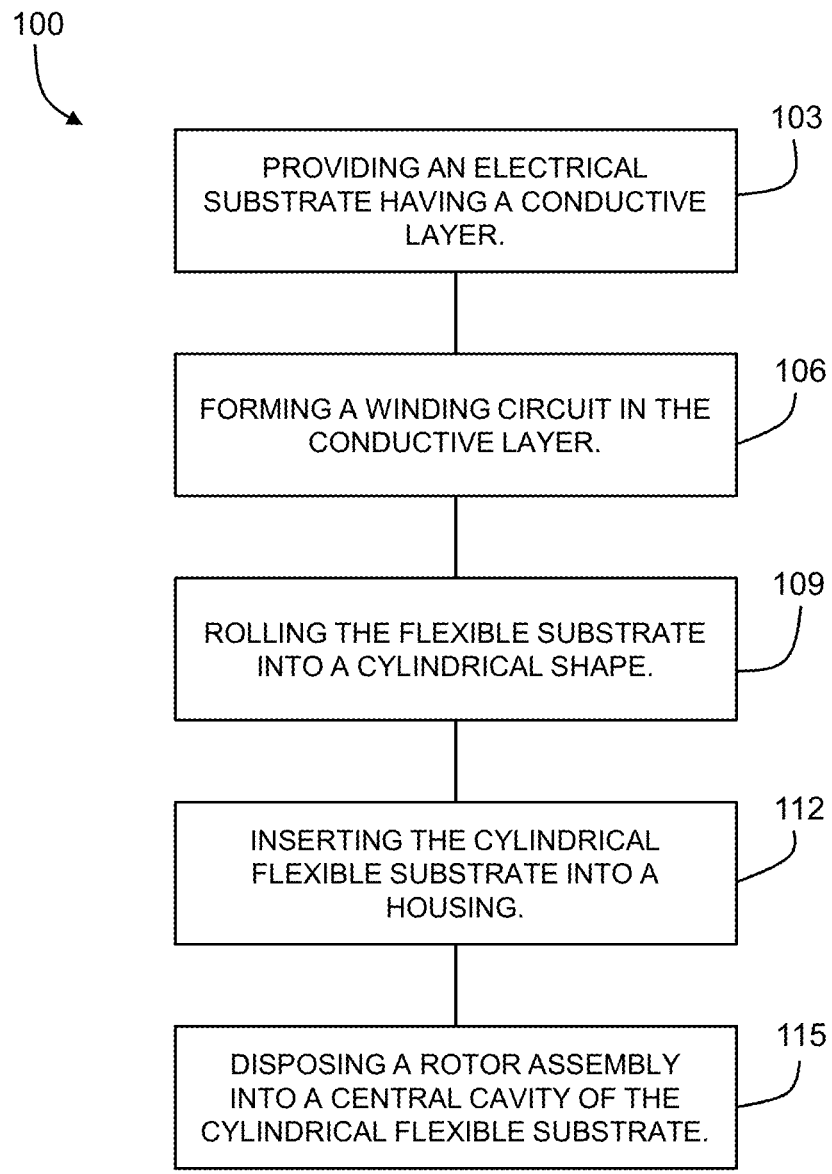
FIG. 5 is a flowchart of a method according to an embodiment of the present invention.

The present invention may be embodied as an electric machine 50 having a stator winding 52 comprising a flexible winding 54 as described above. See, e.g., FIG. 4. The stator winding 52 may be generally cylindrical in shape with a central cavity 56 within the cylindrical perimeter. The stator winding 52 is disposed within a stator backing 58 (also called a stator backiron or stator ring) to form a stator assembly. The stator backing 58 may be comprised of laminations. The stator assembly may be disposed in a housing 62 of the electric machine 50. A rotor assembly 70 is disposed in the central cavity 56 of the stator winding 52. The rotor assembly 70 comprises a shaft 72 which is coaxial with the stator assembly 60. The shaft 72 is configured to rotate within the central cavity 56. In some embodiments, the rotor assembly 70 may comprise bearings 74 allowing the shaft 72 to more easily rotate with respect to the stator winding 52. The rotor assembly 70 comprises one or more magnets 76. The one or more magnets 76 may be permanent magnets, such as, for example, rare earth magnets (e.g., neodymium or samarium cobalt). The one or more magnets 76 may be affixed to the shaft 72 such that the magnets 76 can rotate with the shaft 72 and with respect to the stator winding 52. Configured in this way, the stator winding 52 may be considered to be disposed in the air gap of the electric machine 50 between the stator backing 58 and the rotor assembly 70. It may be beneficial to minimize any remaining gap between the rotor assembly 70 and the stator winding 52.

The electric machine 50 may be embodied as a motor. A motor may further comprise a controller in electrical communication with the winding circuit(s) of the flexible winding. As such, the controller is configured to create an magnetic field using the flexible winding. The magnetic field cooperates with the magnets 76 of the rotor assembly 70 to cause the rotor assembly to move. Such a controller may be configured to create a rotating magnetic field, thereby causing rotation of the rotor assembly 70.

The present invention may also be embodied as a method 100 of making a winding for a rotary motor. A flexible substrate is provided 103. The provided 103 flexible substrate has at least one conductive layer. A winding circuit is formed 106 in the conductive layer. The winding circuit may be formed 106 by techniques known in the art for forming circuits in a flexible printed circuit board. For example, the conductive layer may be etched to form the winding circuit. The flexible substrate is rolled 109 into a substantially cylindrical shape (i.e., a spiral cylindrical shape) to form a winding suitable for use as a winding in an electric machine. The rolled 109 (cylindrical) flexible substrate may be inserted 112 into a housing, such as a stator backing (within a motor housing). A rotor assembly may be disposed 115 within an open central cavity of the rolled 109 flexible substrate and configured to be able to rotate in close proximity to the flexible substrate.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A flexible winding for a brushless, rotating motor, comprising:
    a flexible substrate;
    a first winding circuit disposed on a first side of the substrate; and
    wherein the first winding circuit comprises more than one coil, and at least one coil of the more than one coils of the first winding circuit has a different number of turns than the other coils.

2. The flexible winding of claim 1, further comprising a second winding circuit disposed on the first side of the substrate.

3. The flexible winding of claim 2, further comprising a third winding circuit disposed on the first side of the substrate.

4. The flexible winding of claim 3, wherein the first, second, and third winding circuits are configured such that when the flexible winding is rolled into a cylinder shape having a predetermined diameter, each winding circuit is 120° out of phase with each of the other winding circuits.

5. The flexible winding of claim 1, further comprising a second-side winding circuit on a second side of the substrate.

6. The flexible winding of claim 5, wherein the first winding circuit and the second-side winding circuit are electrically connected by a conductor.

7. The flexible winding of claim 6, wherein the conductor is disposed in a via of the substrate.

8. A slotless, brushless motor comprising:
    a stator backing configured as a cylinder;
    a flexible winding having a flexible substrate and a first winding circuit, wherein the flexible winding is configured to be generally cylindrical having a central cavity, the flexible winding disposed within the stator backing, and wherein the first winding circuit comprises more than one coil, and at least one coil of the more than one coils of the first winding circuit has a different number of turns than the other coils; and
    a rotor assembly disposed within the central cavity of the flexible winding and configured to be able to rotate with respect to the flexible winding, the rotor assembly having:
        a shaft;
        one or more bearings disposed on the shaft; and
        one or more magnets affixed to the shaft.

9. The motor of claim 8, further comprising a controller in electrical communication with the flexible winding and configured to induce a magnetic field by way of the flexible winding to cause the rotor assembly to rotate.

10. A method of making a winding for a rotary motor comprising the steps of:
    providing a flexible substrate having a conductive layer;
    forming a winding circuit in the conductive layer, wherein the winding circuit comprises more than one coil, and at least one coil of the more than one coils of the winding circuit has a different number of turns than the other coils; and
    configuring the flexible substrate as a cylinder to form a winding for a rotary motor.

11. The method of claim 10, wherein the winding circuit is formed by etching the conductive layer.

12. The method of claim 10, further comprising the step of inserting the cylindrical flexible substrate into a stator backing.

13. The method of claim 12, further comprising the step of disposing a rotor assembly into a central cavity of the cylindrical flexible substrate.

* * * * *